(12) United States Patent
Karm et al.

(10) Patent No.: US 11,256,622 B2
(45) Date of Patent: Feb. 22, 2022

(54) DYNAMIC ADAPTIVE DRAIN FOR WRITE COMBINING BUFFER

(71) Applicant: Apple Inc., Cupertino, CA (US)

(72) Inventors: Michael L. Karm, Cedar Park, TX (US); Gideon N. Levinsky, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/870,358

(22) Filed: May 8, 2020

(65) Prior Publication Data
US 2021/0349823 A1 Nov. 11, 2021

(51) Int. Cl.
G06F 12/08 (2016.01)
G06F 12/0815 (2016.01)
G06F 12/0811 (2016.01)

(52) U.S. Cl.
CPC ...... G06F 12/0815 (2013.01); G06F 12/0811 (2013.01); G06F 2212/608 (2013.01)

(58) Field of Classification Search
None
See application file for complete search history.

(56) References Cited

U.S. PATENT DOCUMENTS

| | | | |
|---|---|---|---|
| 6,366,984 B1 * | 4/2002 | Carmean | G06F 12/0804 710/52 |
| 8,352,685 B2 | 1/2013 | Bannon et al. | |
| 8,566,528 B2 | 10/2013 | Bannon et al. | |
| 2007/0005842 A1 * | 1/2007 | Sohm | G06F 11/3648 710/62 |
| 2013/0103906 A1 * | 4/2013 | Bannon | G06F 12/0891 711/135 |
| 2014/0143471 A1 * | 5/2014 | Moyer | G06F 12/04 710/310 |
| 2014/0181403 A1 * | 6/2014 | Lilly | G06F 12/0888 711/122 |
| 2014/0337562 A1 | 11/2014 | Long et al. | |
| 2015/0006820 A1 * | 1/2015 | Bhoria | G06F 12/0811 711/122 |

(Continued)

OTHER PUBLICATIONS

Julian et al. "The Brand-New Vector SupercomputingS. Momose et al." "Supercomputing 29th International Conference, ISC 2014 Leipzig, Germany, Jun. 22-26, 2014 Proceedings LNCS 8488"; Located Via Google/Book 'https://books.google.com/books, 1 page.

*Primary Examiner* — Kaushikkumar M Patel
(74) *Attorney, Agent, or Firm* — Kowert, Hood, Munyon, Rankin & Goetzel, P.C.; Lawrence J. Merkel

(57) ABSTRACT

In one embodiment, a processor includes a write combining buffer that includes a memory having a plurality of entries. The entries may be allocated to committed store operations transmitted by a load/store unit in the processor, and subsequent committed store operations may merge data with previous store memory operations in the buffer if the subsequent committed store operations are to addresses that match addresses of the previous committed store operations within a predefined granularity (e.g. the width of a cache port). The write combining buffer may be configured to retain up to N entries of committed store operations, but may also be configured to write one or more of the entries to the data cache responsive to receiving more than a threshold amount of non-merging committed store operations in the write combining buffer.

20 Claims, 6 Drawing Sheets

(56) References Cited

U.S. PATENT DOCUMENTS

2015/0046662 A1\* 2/2015 Heinrich ............ G06F 13/1626
711/151
2016/0132434 A1 5/2016 Brandt et al.
2020/0285580 A1\* 9/2020 Subramanian .......... G06F 13/16

\* cited by examiner

Computer Accessible Storage Medium 200

SOC 204

FIG. 7

DYNAMIC ADAPTIVE DRAIN FOR WRITE COMBINING BUFFER

BACKGROUND

Technical Field

Embodiments described herein are related to processors and, more particularly, to write combining buffers in processors.

Description of the Related Art

Many processors employ one or more levels of cache to reduce effective memory latency for reads and writes performed by the processor. Generally, a cache stores blocks of memory data that have been recently accessed by the processor or have been prefetched by the processor based on a prediction that the data will be read/written by the processor. The cache is a relatively small structure compared to the main memory, and is closer to the processor than main memory, so that the latency to access the cache is lower than the main memory. If a read or write hits in the cache (e.g. the cache block accessed by the read or write is stored in the cache), the latency to perform the read or write is the cache latency instead of the longer memory latency.

A cache includes one or more ports to permit access to the cache. Each port is an independent access point, and thus a cache with multiple ports permits multiple concurrent accesses. There may be limits to the independence, however, such as accesses to the same memory bank within the cache may not be performed concurrently. If concurrent accesses are presented that access the same bank, one of the accesses is cancelled and the other proceeds. There can be other resource conflicts as well. The ports themselves are also resources, and when there are more accesses competing for the cache than there are ports, one or more of the accesses are delayed.

The port has a data width, which is the maximum amount of data that can be accessed on the port. The data width can be as large as a cache block, or can be a portion of the cache block, such as 16 bytes or 32 bytes aligned to a 16-byte or 32-byte boundary. Based on the address accessed by a read or write, and the size of the read or write, less than the full amount of the port data width can actually be used by the read or write.

In some cases, a processor implements a write combining buffer that logically resides in front of a given cache level (e.g. the level 1 data cache that is accessed first for a given read or write). Writes that are architecturally committed (that is, a store operation that generated the write has been retired by the processor and is viewed by the processor as having updated memory, even if the write has not yet occurred) can be written to the write combining buffer to await an opportunity to write the data cache. Among other things, write combining buffers allow for data to be merged from multiple store operations that update nearby addresses (e.g. addresses within the same port width of the data cache) and one write operation to the data cache can be performed to update memory for the merged write data; and provide a relatively inexpensive store to hold data from recently committed store operations. The data merge can reduce power consumption, since writes to the write combining buffer often consume less power than writes to the data cache. The inexpensive storage provides buffering to absorb the impact of a stream of store operations when resource conflicts prevent the store operations from accessing a data cache port. The store operations can continue to execute/retire as long as there is write combining buffer space available for them.

To merge data in the write combining buffer, it is desirable to retain writes in the write combining buffer for as long as possible to permit more opportunities for subsequent writes to arrive. On the other hand, retaining writes in the write combining buffer effectively reduces the number of entries available to absorb a stream of writes without causing execution stalls. Finding a balance between retaining writes and freeing entries for further writes is complex. In many cases, processor designs increase the number of write combining buffer entries, which comes at a cost of area and power.

SUMMARY

In one embodiment, a processor includes a write combining buffer that includes a memory having a plurality of entries. The entries may be allocated to committed store operations transmitted by a load/store unit in the processor, and subsequent committed store operations may merge data with previous store memory operations in the buffer if the subsequent committed store operations are to addresses that match addresses of the previous committed store operations within a predefined granularity (e.g. the width of a cache port). The write combining buffer may be configured to retain up to N entries of committed store operations, but may also be configured to write one or more of the entries to the data cache responsive to receiving more than a threshold amount of non-merging committed store operations in the write combining buffer.

In an embodiment, the writing of one or more entries to the cache when non-merging committed store operations are detected above the threshold may effectively permit more entries to become available for cases in which a stream of store operations are being executed to different/non-mergeable addresses. That is, the write combining buffer may dynamically modify the number of entries being used to attempt to merge committed store operations based on the amount of merging/non-merging being experienced. A given number of entries may be more efficiently used over different workload scenarios, which may improve performance and/or permit the use of smaller write combining buffer (e.g. fewer entries) while still performing well over the varying workloads

BRIEF DESCRIPTION OF THE DRAWINGS

The following detailed description refers to the accompanying drawings, which are now briefly described.

FIG. 7 is a block diagram of one embodiment of a computer accessible storage medium.

Figure 1:
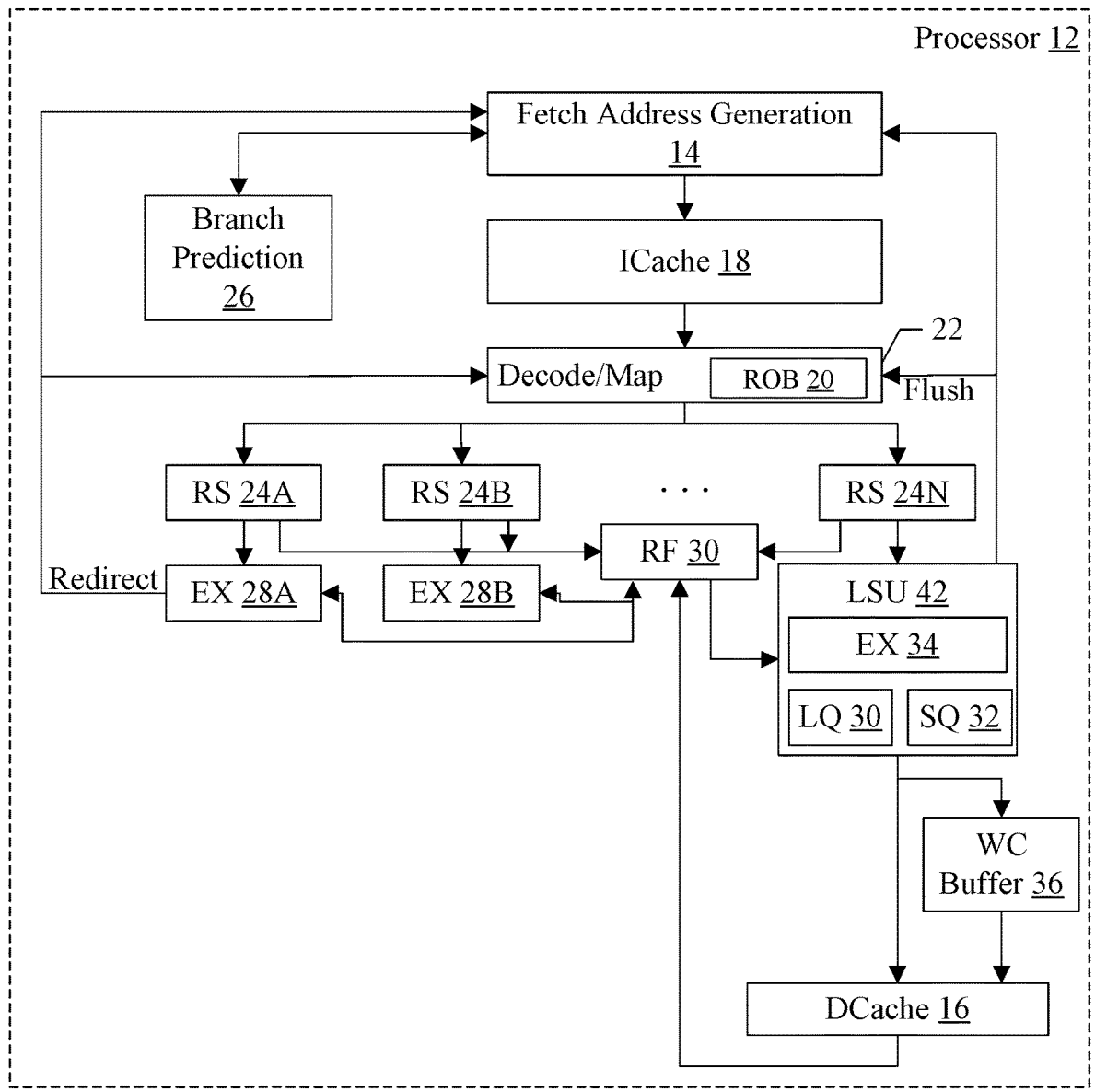
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Similarly, as used herein, the term "responsive to" or "in response to" is used to describe one or more factors that may contribute to causing a result. This term does not foreclose the possibility that additional factors may affect the causation, either independently or jointly with the specified factors. That is, a result may be solely responsive to the specified factors or responsive to the specified factors and/or other, unspecified factors. Consider the phrase "perform A responsive to B." This phrase specifies that B is a factor in causing A or that affects the causation of A. This phrase does not foreclose that the causation of A may responsive to some other factor, such as C, independent of B or jointly with B. This phrase is also intended to cover an embodiment in which A is caused solely responsive to B. As used herein, the phrase "responsive to" is synonymous with the phrase "responsive at least in part to." Similarly, the phrase "in response to" is synonymous with the phrase "at least in part in response to."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of a processor 12 is shown. In the illustrated embodiment, the processor 12 includes a fetch address generation circuit 14, an instruction cache ("ICache") 18, a decode/map unit 22 (including a reorder buffer (ROB) 20), a branch prediction unit 26, one or more reservation stations 24A-24N, one or more execution units 28A-28B, a register file 30, a data cache ("DCache") 16, a load/store unit (LSU) 42, and a write combining (WC) buffer 36. The LSU 42 includes a load queue (LQ) 30, a store queue (SQ) 32, and an execution circuit 34 coupled to the LQ 30 and the SQ 32.

The fetch address generation circuit 14 is coupled to the ICache 18, which is coupled to the decode/map unit 22, which is coupled to the reservation stations 24A-24N. The reservation stations 24A-24B are coupled to the execution units 28A-28B as shown in FIG. 1, and the reservation station 24N is coupled to the LSU 42. The reservation stations 24A-24N are also coupled to the register file 30, which is coupled to the execution units 28A-28B and the LSU 42. The LSU 42 is also coupled to the DCache 16 and the WC buffer 36. The WC buffer 36 is coupled to the DCache 16, which is coupled to the register file 30. The branch prediction unit 26 is coupled to the fetch address generation circuit 14. One or more of the execution units 28A-28B may be configured to provide a redirect to the fetch address generation circuit 14 and the decode/map unit 22 (e.g. in the event of a branch misprediction or other microarchitectural exception, in an embodiment). The LSU 42 may provide a flush indication to the fetch address generation circuit 14 and the decode/map unit 22 in the illustrated embodiment. Alternatively, the flush indication may be provided to the decode/map unit 22, which may flush the ops after the flush point and provide a refetch address to the fetch address generation circuit 14.

The fetch address generation circuit 14 may be configured to generate fetch addresses (fetch PCs) to fetch instructions from the ICache 18 for execution by the processor 12. The fetch address generation circuit 14 may implement various prediction structures to predict the fetch path. For example, a next fetch predictor may be used to predict fetch addresses based on previously executed instructions. In such an embodiment, the branch prediction unit 26 may be used to verify the next fetch prediction. Alternatively, the branch prediction unit 26 may be used to predict next fetch addresses if the next fetch predictor is not used.

The branch prediction unit 26 may include one or more branch predictors such as a branch direction predictor, an indirect branch predictor, and a return address stack predictor. Various embodiments may include any subset of the above branch predictors and/or other predictors. The branch direction predictor may be configured to predict the taken/not taken result for conditional branches. Based on the taken/not taken result, the next fetch address may be either the branch target address or the next sequential address. The branch target address may be the address specified by the branch instruction (or more briefly, branch) to which fetching is to be directed when the branch is taken (or is always the location to which fetching is to be directed, for unconditional branches). The next sequential address may be the address that numerically follows the PC of the branch, and may be the next fetch address if the branch is not taken (similar to non-branch instructions, which are fetched in sequential order). The return address stack may predict the fetch addresses for return instructions, based on previous call instructions. The call and return instructions may be used, e.g. to call and return from subroutines/functions, etc. The call instruction may push a return address on the stack (e.g. to the next sequential instruction after the call), and the return instruction may pop the top of the stack to generate the return address. The stack may be in memory, or may be simulated via a register written by the call instruction and read by the return instruction. The indirect branch predictor may predict the target address of an indirect branch instruction. In an embodiment, the indirect branch predictor may be a Tagged Geometric (TAGE)-style branch predictor which has multiple memories. A base memory may be indexed by the PC or a hash of the PC, and other memories may be indexed by the PC hashed with different amounts of branch history. The base memory may not be tagged, but the other memories may be tagged. If a tag hit is detected in one or more of the other memories, the branch target address may be predicted to be the target address from the memory that is indexed with the largest amount of history and that is also a tag hit for the branch. If no tag hit is detected, the branch target address may be predicted to be the target address from the base memory. Other embodiments may implement other types of indirect branch predictors. For example, a single table indexed by branch PC and branch history, or simply branch PC, may be used. A single tagged table may be used.

The decode/map unit 22 may be configured to decode the fetched instructions from the ICache 18 into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the term "instruction operation" may be essentially synonymous with "instruction" in such embodiments (although it may be modified in form by the decoder). The term "instruction operation" may be more briefly referred to herein as "op."

The decode/map unit 22 may be configured to map the ops to speculative resources (e.g. physical registers) to permit out-of-order and/or speculative execution, and may dispatch the ops to the reservation stations 24A-24N. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The decode/map unit 22 may manage the mapping of the architected registers to physical registers. There may be separate physical registers for different operand types (e.g. integer, vector, floating point, etc.) in an embodiment. In other embodiments, the physical registers may be shared over operand types. The decode/map unit 22 may also be responsible for tracking the speculative execution and retiring ops or flushing misspeculated ops. The ROB 20 may be used to track the program order of ops and manage retirement/flush, for example.

Ops may be scheduled for execution when the source operands for the ops are ready. In the illustrated embodiment, decentralized scheduling is used for each of the execution units 28A-28B and the LSU 42, e.g. in the reservation stations 24A-24N. Other embodiments may implement a centralized scheduler if desired. Scheduled ops may read their source operands from the register file 30 and/or may have operands forwarded from previous ops executed by the execution units 28A-28B and/or LSU 42. The results of ops that have target registers may be written to the register file 30 and/or forwarded to dependent ops.

The LSU 42 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue 32 with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g. if the store data operand is provided before one or more of the store address operands. While store ops may be executed as store address and store data ops in some embodiments, other embodiments may not implement the store address/store data split.

The execution circuit 34 in the LSU 42 may execute the load/store ops issued by the reservation station 24N. The execution circuit 34 may access the data cache 16 to determine hit/miss for the load/store ops, and to forward data for loads. The execution circuit 34 may check the store queue 32 for ordering issues with loads being executed, as well as to forward data from a store or stores in the store queue 32 for a load that is younger than the store or stores and matches the address of the store(s) in the store queue 32. Similarly, the execution circuit 34 may check the load queue 30 to detect ordering issues for a store being executed. When ordering issues are detected, if the op being executed is the op that needs to finish later than an op in one of the queues 30-32, an internal retry of the op may be used to properly order the ops. If the op in the queue 30-32 needs to finish later than an op that is being executed, a flush is often needed (e.g. if a load has forwarded data and is in the load queue 30, and an older store executes and updates the same data or a portion of the data, then incorrect data has been forwarded).

The store queue 32 may queue store ops that have been executed (e.g. probed the cache) and are awaiting commit (e.g. once a given store op is retired, or ready to be retired, in various embodiments). Generally, a store may be committed when the processor 12 has at least determined that the store is guaranteed to update the target memory location (e.g. the store cannot be flushed due to an interrupt, architected fault or exception, or microarchitectural exception). In an embodiment, a store may be committed when the store is retired by the processor 12. The LSU 42/execution circuit 34 may forward data from the store queue 32 for younger load ops. In the case that the store has an address matching the load address but does not have data available, the LSU 42/execution circuit 34 may retry the load based on the store queue 32 match and wait for store data to become available. The store queue 32 may also be used to detect ordering issues with loads.

Similarly, the load queue 30 may queue load ops that have been executed. The load queue 30 may include load ops that have been retired and are to be executed again, either as soon as possible or after occurrence of a subsequent event related to the reason that the retry was detected. The load queue 30 may also be used by the LSU 42 to detect ordering issues with stores, so that loads that have completed (e.g. irreversibly forwarded data to a target) and have an ordering issue may be flushed. The ordering issues detected using the load queue 30 and the store queue 32 may include memory ordering model issues and/or issues related to the coherence of memory locations that are read by load ops and written by store ops in the same thread or code sequence being executed by the processor 12.

The LSU 42 may select committed store ops from the store queue 32, and may transmit the selected committed store ops to update a memory location addressed by the selected committed store ops. The committed store ops may be issued to the write combining buffer 36 (WC buffer 36) for buffering and potential merging with previously committed store ops. The WC buffer 36 may compare the address of the committed store operation issued by the LSU 42 to the addresses of previous committed store ops in the WC buffer 36. The comparison may be performed at predetermined granularity (e.g. the addresses may match in the comparison if the addresses match in the most significant bits, excluding least significant bits that define an offset within the granularity). For example, a 16-byte granularity may exclude the least significant 4 bits of the address, while a 32-byte granularity may exclude the least significant 5 bits of the address. The granularity may be the size of the port on the DCache 16, for example. In other embodiments, other granularities may be used (e.g. a cache line, a portion of a cache line larger than the port size, etc.). If the addresses match at the granularity, the WC buffer 36 may merge the data from the committed store op and the previous committed store op. If one or more bytes of store data overlap between the existing stored data in the WC buffer 36 and the new data being merged into the buffer, the new data may overwrite the overlapping bytes. It is noted that any number of committed store ops may be merged in an entry in the WC buffer 36, as long was the entry remains stored in the buffer.

The WC buffer 36 may include a memory having a plurality of entries, wherein a given entry in the WC buffer 36 may be assigned to a committed store memory op that is not merged into another entry assigned to a previous committed store op. As committed store ops are presented to the WC buffer 36, they may be merged into currently-allocated entries if the addresses match with the predetermined granularity, or they may be allocated a different entry if the addresses do not match. The WC buffer 36 may retain up to N entries in the memory, where N may be an integer greater than zero and less than the number of entries in the memory. If an additional entry is to be allocated, one of the currently allocated entries may be selected to update the DCache 16. The number of entries N that the WC buffer 36 attempts to retain may be referred to as a "watermark" for the memory, as it measures a relatively fullness of the memory compared to the number of entries available in the memory. The initial watermark may be programmable or fixed in various implementations, and may be determined based on the ability of the WC buffer 36 to absorb non-mergeable committed store ops that may be in the pipeline and/or may be issued from the store queue 32 without frequently stalling the LSU 42.

If merging is occurring with a reasonable frequency, the initial watermark may be maintained as it may be providing acceptable performance for the processor 12 as a whole. However, if a workload is encountered in which merging is occurring at lower rates (e.g. a long series of streaming store ops to memory locations that often extend outside of the predetermined granularity at which addresses are compared), then WC buffer 36 may become full more frequently than desired, causing the LSU 42 to stall the issuance of committed store ops. The WC buffer 36 may be configured to detect such scenarios (or infer such scenarios) by monitoring how frequently merging and/or non-merging committed stores are encountered. If the non-merging store frequency is increasing, the WC buffer 36 may be configured to dynamically accelerate the selection of entries to update the DCache 16, freeing entries earlier for allocation to non-merging stores and thus decreasing stalls in such workloads. Additional details will be provided further below.

The execution units 28A-28B may include any types of execution units in various embodiments. For example, the execution units 28A-28B may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector processing may be characterized by performing the same processing on significant amounts of data, where each datum is a relatively small value (e.g. 8 bits or 16 bits, compared to 32 bits to 64 bits for an integer). Thus, vector ops often include single instruction-multiple data (SIMD) or vector operations on an operand that represents multiple data items.

Thus, each execution unit 28A-28B may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of dependent ops occurs may vary based on the type of op and execution unit 28 that will be executing the op.

It is noted that any number and type of execution units 28A-28B may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments.

At various points, ops are referred to as being younger or older than other ops. A first operation may be younger than a second operation if the first operation is subsequent to the second operation in program order. Similarly, a first operation may be older than a second operation if the first operation precedes the second operation in program order.

Figure 2:
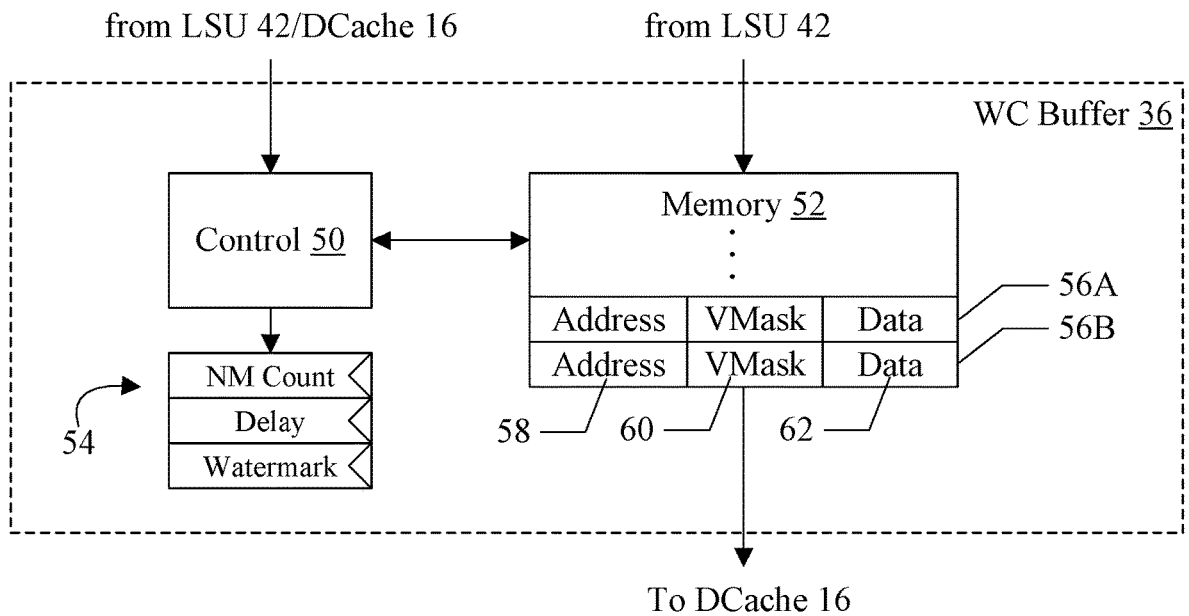
FIG. 2 is a block diagram of one embodiment of a write combining buffer shown in FIG. 1.

Turning now to FIG. 2, a block diagram of one embodiment of the write combining buffer 36 is shown. In the illustrated embodiment, the WC buffer 36 includes a control circuit 50 coupled to a memory 52 and a plurality of registers 54. The control circuit 50 is coupled to the LSU 42 and the DCache 16, and the memory 52 is coupled to the LSU 42 the DCache 16 as well. The memory 52 includes a plurality of entries such as entries 56A-56B. The entries 56A-56B may include various fields such as an address field 58, a valid mask (VMask) field 60, and a data field 62. The data field 62 may include the bytes to be written to the DCache 16/main memory. The data field 62 may thus be the width of the granularity used by the WC buffer 36 (e.g. the cache port width, cache line width, etc.).

A given entry of the plurality of entries 58A-58B may be assigned by the control circuit 50 when a non-merging committed store op is received. That is, when the WC buffer 36 receives a committed store op from the LSU 42, the WC buffer 36 may be configured to compare the address of the committed store op (that is, the address of the target memory location of the committed store op) to the address fields 58 in the entries 58A-58B. The addresses may be compared at the granularity of the entry, e.g. a data cache port width, a cache line, or other desired granularity. Based on detection that the addresses match within the granularity, and further based on the entry being valid (e.g. at least one of the bits in the VMask in the VMask field 60 of the entry is set), the newly-received committed store op may be merged into the entry. If the address of the newly-received committed store op does not match a valid entry in the memory 52, the control circuit 50 may be configured to assign a free entry within the memory 52 to the newly-received committed store op. The control circuit 50 may be configured to initialize the entry with the address of the committed store op, a VMask indicating which bytes within the granularity are updated by the entry, and the data of the newly-received committed store op.

Accordingly, a given valid entry 58A-58B in the memory stores at least one previous committed store op, represented by the address, the VMask, and the data. The given entry 58A-58B may store two or more merged committed store ops if a merge has been detected within the granularity of the initial committed store op that was assigned to the given entry 58A-58B. The VMask may indicate which bytes are valid in the data in the entry. For example, the VMask may be a bit mask having a bit for each byte in the data, which may be set to indicate that the byte is valid (e.g. has been written by a committed store op in the entry) or clear to indicate that the byte is invalid (e.g. has not been written by a committed store op in the entry). The opposite senses of set and clear may be used in other embodiments, and other encodings of the VMask may be used in other embodiments.

The control circuit 50 may be configured to retain entries in the memory 52 while merging activity is detected. For example, in the illustrated embodiment, the registers 54 store a watermark. The watermark may be an integer (e.g. N, or N may be determined from the watermark) that may be greater than one. Additionally, the watermark may be less than the total number of entries in the memory 52. Alternatively, the watermark may be expressed as a percentage or fraction of the total number of entries. By having the watermark set to fewer than the total number of entries, the LSU 42 may be able to issue additional committed store ops to the WC buffer 36 without stalling, because the entries that are not occupied when the watermark is not exceeded are available to the additional committed store ops if they are not mergeable in the valid entries. Thus, the WC buffer 36 may be configured to retain up to N entries for potential merging. The control circuit 50 may drain an entry when N entries are valid in the memory 52 and another entry is allocated to a non-merging committed store op, thus exceeding the watermark. For example, the oldest entry in the memory 52 may be drained, or the least recently merged entry may be drained. Thus, the control circuit 50 may retain up to N entries prior to causing one or more entries to drain (e.g. the control circuit 50 may retain entries when fewer than N entries are occupied).

In one embodiment, the control circuit 50 may also be configured to write data from one or more of the N retained entries to the DCache 16 based on detection that at least a threshold level of non-merging (or nonmergeable) committed store ops are have been detected. Once the data from the retained entry is written to the DCache 16, the entry may be dequeued (e.g. invalidated, by clearing the VMask for example). Thus, the entry becomes free for use by a subsequent committed store op that does not merge with other entries in the memory 52. Writing the data from an entry and freeing the entry may also be referred to as draining the entry. The draining of one or more entries may occur independent of whether or not a full number of N entries has been reached. Similarly, draining each valid entry from the WC buffer 36 may be referred to as draining the WC buffer 36.

In one embodiment, the registers 54 may store a non-merging counter (NM counter), which the control circuit 50 may be configured to use to track the non-merging committed store ops. For example, the control circuit 50 may be configured to increment the counter based on detection of a non-merging committed store op and to decrement the counter based on detection of a merging store op. In another embodiment, the control circuit 50 may be configured to clear the counter based on detection of a merging committed store op. The value of the counter may be used to determine if the threshold level of non-merging committed store ops has been reached or exceeded.

In one embodiment, the control circuit 50 may be configured to drain entries for a fixed period of time subsequent to detection that the threshold level of non-merging committed store ops has been reached, and then cease draining (or terminate draining). The registers 54 may store a delay, for example, the specifies a length of the fixed time period. Alternatively, the control circuit 50 may be configured to drain a fixed number of the retained entries once the non-merging counter reaches or exceeds the threshold. In another embodiment, the control circuit 50 may be configured to drain the entire memory 52. In yet another embodiment, the control circuit 50 may ceased draining if another merging committed store op is detected.

In an embodiment, the control circuit 50 may drain an entry due to the detection of nonmergeable committed store ops based on a subsequent committed store op reaching a point in the pipeline of the processor 12 at which the subsequent committed store op is nearly ready to write the WC buffer 36. In this manner, the WC buffer 36 may retain entries for as long as possible prior to draining.

In another embodiment, the control circuit 30 may reduce the watermark to cause entries to be written to the DCache 16. The reduction may be temporary, e.g. for a fixed time period or until a subsequent event occurs such as another merging committed store op. Reducing the watermark effectively makes it appear that the number of retained entries has exceeded the watermark and a similar mechanism may be used to write data from one or more entries to the DCache 16 to free entries and reduce the retained entries to the watermark.

Figure 3:
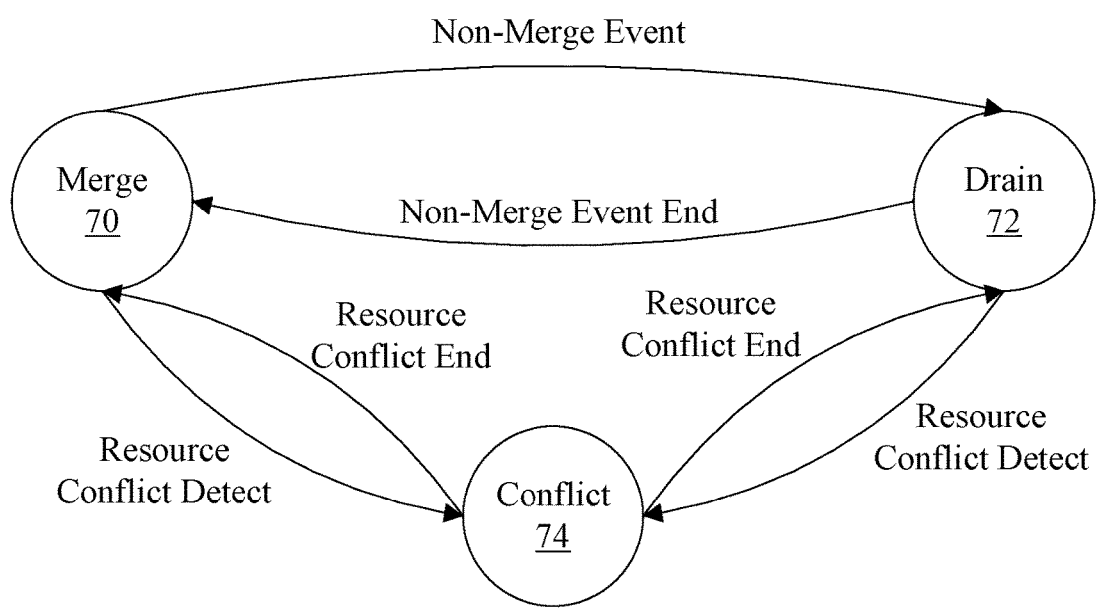
FIG. 3 is a state machine implemented by one embodiment of the write combining buffer shown in FIGS. 1 and 2.

FIG. 3 is a block diagram of one embodiment of a state machine that may represent operation of one embodiment of the WC buffer 36 (and more particularly the control circuit 50). The state machine includes a merge state 70, a drain state 72, and a conflict state 74.

The merge state 70 may be the initial state of the state machine, in which the WC buffer 36 is retaining up to the watermark number of entries to attempt to merge previous committed store ops and subsequent committed store ops. The WC buffer 36 may transition from the merge state 70 to the drain state 72 in response to detecting a non-merge event. For example, the non-merge event may be the NM count exceeding the threshold, as discussed above.

The drain state 72 may be the state in which the WC buffer 36 attempts to write data from one or more entries of the memory 52 to the DCache 16 and/or memory (draining one or more entries). While in the drain state 72, the WC buffer 36 may still merge committed store ops that are transmitted by the LSU 42, if a match is detected in the memory 52. While in the drain state 72, a non-merge event end may be detected. The end of the non-merge event may occur after a fixed number of entries have been drained, after the complete memory 52 has been drained, after the NM count has been reduced below a threshold, and/or any combination of the above and other factors, as desired. If the end of the non-merge event is detected, the state machine may transition from the drain state 72 back to the merge state 70.

In an embodiment, the WC buffer 36 may be configured to detect a potential resource conflict to access cache. For example, the resource may be a data cache port and the conflict may be that the port is occupied by other memory ops issued by the LSU 42, back to back cache fills returning from memory or another level of cache, etc. The WC buffer 36 may monitor the LSU pipeline, the fill pipeline, etc. to detect that resourced conflicts may occur. If such a resource conflict is detected, the state machine may transition from either the merge state 70 or the drain state 72 to the conflict state 74. In the conflict state 74, the WC buffer 36 may attempt to write data from one or more entries of the memory 52 prior to an occurrence of an actual conflict, ensuring that space is available in the WC buffer 36 for additional committed store ops. While in the conflict state 74, the WC buffer 36 may still merge committed store ops that are transmitted by the LSU 42, if a match is detected in the memory 52. When the resource conflict ends (or when one or more entries have been drained), the state machine may return from the conflict state 74 to the merge state 70 or the drain state 72, whichever was the state of the WC buffer 36 prior to transitioning to the conflict state 74. Other embodiments may not implement the conflict state 74.

Figure 4:
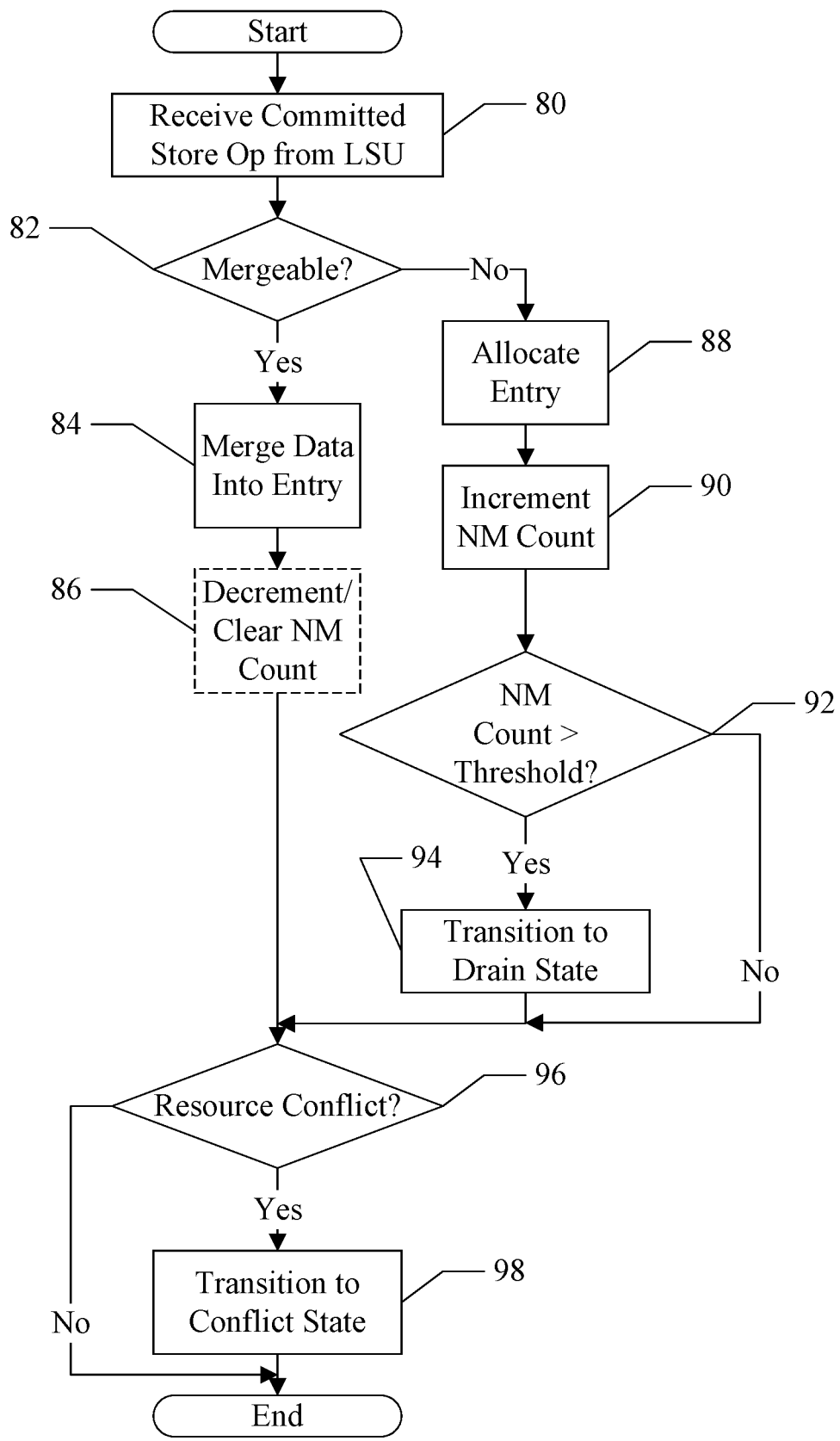
FIG. 4 is a flowchart illustrating certain operation of one embodiment of the write combining buffer shown in FIGS. 1 and 2.

Turning next to FIG. 4, a flowchart is shown illustrating certain operation of one embodiment of the WC buffer 36 (and more particularly the control circuit 50) illustrated in FIGS. 1 and 2, with the state machine of FIG. 3. While the blocks are shown in a particular order for ease of understanding, other orders may be used. Blocks may be performed in parallel in combinatorial logic in the WC buffer 36/control circuit 50. Blocks, combinations of blocks, and/or the flowchart as a whole may be pipelined over multiple clock cycles. The WC buffer 36/control circuit 50 may be configured to implement the operation shown in FIG. 4.

The WC buffer 36 may receive a committed store op from the LSU 42 (block 80), and may determine if the committed store op is mergeable with a previous committed store op in the WC buffer 36 (decision block 82). For example, the committed store op may hit an entry in the buffer (e.g. if the address in the entry and the address of the committed store op match within the granularity of the entry). If the committed store op is mergeable (decision block 82, "yes" leg), the WC buffer 36 may merge the data of the committed store op into the entry (block 84). In some embodiments, the WC buffer 36 may also decrement or clear the NM counter (block 86). As mentioned previously, in an embodiment, the merging operation illustrated via blocks 84 and 86 may occur whenever a mergeable store is detected (e.g. in any of the states shown in FIG. 3).

If the committed store op is not mergeable (decision block 82, "no" leg), the WC buffer 36 may allocate an entry in the memory 52 for the committed store op (block 88). The WC buffer 36 may initialize the entry with the address of the committed store op, initialize the VMask to indicate the bytes written by the committed store op, and initialize the data field with the bytes written by the store (in positions within the data field depending on the offset of the store address within the granularity of the entry). The WC buffer 36 may also increment the NM counter (block 90). If the NM counter is greater than the threshold for non-merging committed store ops (decision block 92, "yes" leg), the WC buffer 36 may transition the state machine to the drain state 72 (assuming the state machine is in the merge state 70—block 94).

If the WC buffer 36 detects a potential resource conflict (decision block 96, "yes" leg), the WC buffer 36 may transition the state machine to the conflict state 74 (block 98).

Figure 5:
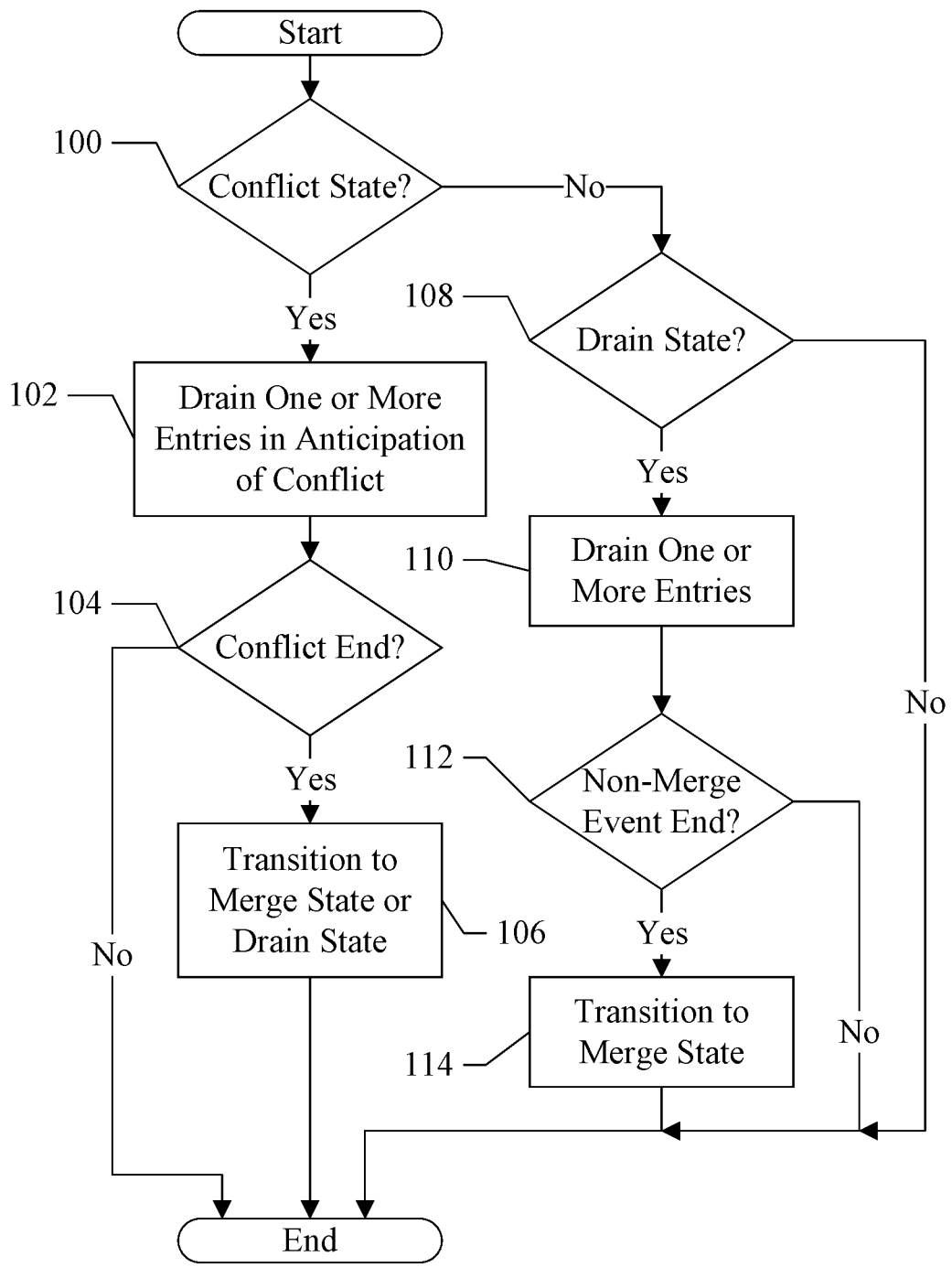
FIG. 5 is a flowchart illustrating certain additional operation of one embodiment of the write combining buffer shown in FIGS. 1 and 2.

Turning next to FIG. 5, a flowchart is shown illustrating certain additional operation of one embodiment of the WC buffer 36 (and more particularly the control circuit 50) illustrated in FIGS. 1 and 2, with the state machine of FIG. 3. While the blocks are shown in a particular order for ease of understanding, other orders may be used. Blocks may be performed in parallel in combinatorial logic in the WC buffer 36/control circuit 50. Blocks, combinations of blocks, and/or the flowchart as a whole may be pipelined over multiple clock cycles. The WC buffer 36/control circuit 50 may be configured to implement the operation shown in FIG. 4.

If the state machine is in the conflict state 74 (decision block 100, "yes" leg), the WC buffer 36 may drain one or more entries in anticipation of a conflict for a resource used by the WC buffer 36 to write the DCache 16 (block 102). If the potential conflict ends (decision block 104, "yes" leg), the WC buffer 36 may transition to the merge state 70 or the drain state 72, whichever state machine was in prior to transitioning to the conflict state 74 (block 106).

If the state machine in in the drain state 72 (decision block 108, "yes" leg), the WC buffer 36 may drain one or more entries (block 110). If the WC buffer 36 detects an end to the non-merge event (e.g. as described above—decision block 112, "no" leg) the WC buffer 36 may transition the state machine to the merge state 70 (block 114).

System

Figure 6:
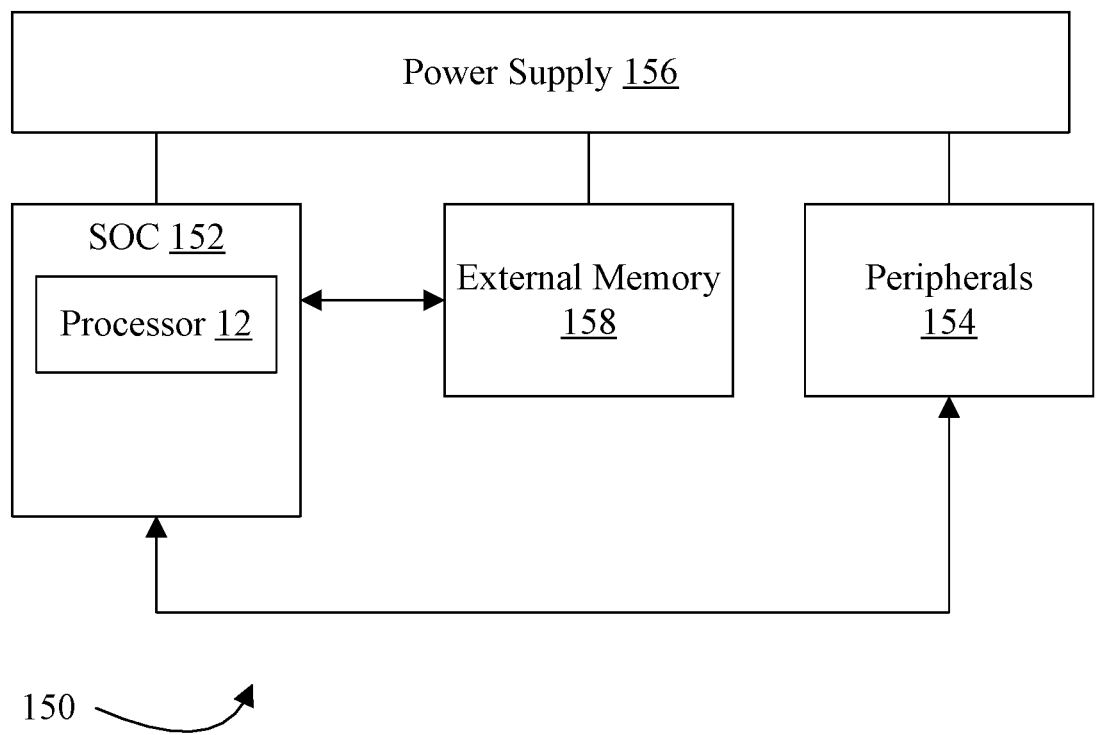
FIG. 6 is a block diagram of one embodiment of a system.

Turning next to FIG. 6, a block diagram of one embodiment of a system 150 is shown. In the illustrated embodiment, the system 150 includes at least one instance of a system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 12 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as Wi-Fi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Computer Readable Storage Medium

Turning now to FIG. 7, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or nonvolatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 7 may store a database 204 representative of the SOC 152. Generally, the database 204 may be a database which can be read by a program and used, directly or indirectly, to fabricate the hardware comprising the SOC 152. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 152. The netlist may then be placed and routed to produce a data set describing geometric shapes to be applied to masks. The masks may then be used in various semiconductor fabrication steps to produce a semiconductor circuit or circuits corresponding to the SOC 152. Alternatively, the database 204 on the computer accessible storage medium 200 may be the netlist (with or without the synthesis library) or the data set, as desired.

While the computer accessible storage medium 200 stores a representation of the SOC 152, other embodiments may carry a representation of any portion of the SOC 152, as desired, including the processor 12, any subset of the processor 12 or portions thereof, etc. The database 204 may represent any portion of the above.

In accordance with the above description, a processor may comprise a load/store unit and a write combining buffer coupled to the load/store unit. The load/store unit may be configured to transmit a first committed store memory operation to update a memory location addressed by the first committed store memory operation. The write combining buffer may comprise a memory having a plurality of entries. The write combining buffer may be configured to store a previous committed store memory operation in a first entry of the plurality of entries. The write combining buffer may be configured to merge the first committed store memory operation with the previous committed store memory operation in the first entry based on detection that an address of the first committed store memory operation matches an address of the previous committed store memory operation at a predetermined granularity. The write combining buffer may be configured to retain up to N entries of the plurality of entries for potential merging, where N is an integer greater than one. The write combining buffer may be configured to write data from one or more of the N entries to a cache based on detection that at least a threshold level of non-merging committed store memory operations have been detected by the write combining buffer. In an embodiment, the write combining buffer may comprise a counter. The write combining buffer may be configured to increment the counter based on detection of a given non-merging committed store memory operation. The threshold level of the non-merging committed store memory operations may be determined from the counter. In an embodiment, the write combining buffer may configured to decrement the counter based on detection of a merging committed store memory operation. In an embodiment, the write combining buffer may be configured to clear the counter based on detection of a merging committed store memory operation. In an embodiment, the write combining buffer may be configured to write data from one or more of the N entries during a fixed time period subsequent to detection of at least the threshold level of non-merging committed store memory operations. The write combining buffer may be configured to cease writing data from one or more of the N entries based on termination of the fixed time period. In an embodiment, N may be determined from a watermark maintained by the write combining buffer. The write combining buffer may be configured to reduce the watermark to cause the data from the one or more of the N entries to be written to the cache. In an embodiment, the write combining buffer may be configured to detect a potential resource conflict to access the cache. The write combining buffer may be configured to write data from the one or more of the N entries prior to an occurrence of an actual resource conflict based on detection of the potential resource conflict, even if the threshold level is not met. In an embodiment, the predetermined granularity may be based on a data width of a cache port. In an embodiment, the write combining buffer may be configured to allocate an unoccupied entry of the plurality of entries to a second committed store memory operation that is not mergeable with previous committed store memory operations in the plurality of entries.

In another embodiment, a write combining buffer may comprise a memory comprising a plurality of entries, each entry assignable to a different committed store memory operation, and a control circuit coupled to the memory. The control circuit may be configured to retain up to N entries in the memory prior to causing one or more entries to drain, where N is an integer greater than one. The control circuit may be configured to merge a first committed store memory operation into a first entry of the plurality of entries, where the first entry may store a second committed store memory operation. The control circuit may be configured to drain one or more entries based on detection that unmergeable committed store operations have reached a threshold even in the event that fewer than N entries are occupied. In an embodiment, the control circuit may be configured to increment a counter based on detection of a given unmergeable committed store operation, and a value of the counter may be compared to the threshold. In an embodiment, the control circuit may be configured to decrement the counter based on detection of the merge of the first committed store memory operation. In an embodiment, the control circuit may be configured to clear the counter based on detection of the merge of the first committed store memory operation. In an embodiment, the control circuit may be configured to terminate draining of the entries after a fixed delay from initiating the draining of the entries. In an embodiment, N may be determined from a watermark maintained by the write combining buffer, and the control circuit may be configured to reduce the watermark to cause the drain of one or more entries. In an embodiment, the control circuit may be configured to detect a potential resource conflict to access a cache. The write combining buffer may be configured to write data from one or more entries prior to an occurrence of an actual resource conflict based on detection of the potential resource conflict, even in the event that fewer than N entries are occupied.

In another embodiment, a method may comprise: receiving a first committed store memory operation in a write combining buffer; detecting that the first committed store memory operation is not mergeable with a plurality of committed store memory operations in the write combining buffer; detecting that a threshold of non-mergeable committed store memory operations has been met; and writing one or more of the plurality of committed store memory operations to a cache based on determining that the threshold has been met. In an embodiment, the method further comprises allocating a location in the write combining buffer for the first committed store memory operation. In an embodiment, the method may further comprise receiving a second committed store memory operation in a write combining buffer; detecting that the second committed store memory operation is mergeable with a third committed store memory operation in the write combining buffer; and merging the second committed store memory operation and the third committed store memory operation. In an embodiment, the method may further comprise incrementing a counter based on detecting that the first committed store memory operation is unmergeable, wherein the threshold may be determined from the counter.

Numerous variations and modifications will become apparent to those skilled in the art once the above disclosure is fully appreciated. It is intended that the following claims be interpreted to embrace all such variations and modifications.

What is claimed is:

1. A processor comprising:
    a load/store unit configured to transmit a first committed store memory operation to update a memory location addressed by the first committed store memory operation; and
    a write combining buffer coupled to the load/store unit, wherein the write combining buffer comprises a memory having a plurality of entries, and wherein the write combining buffer is configured to store a second committed store memory operation in a first entry of the plurality of entries, and wherein the write combining buffer is configured to merge the first committed store memory operation with the second committed store memory operation in the first entry based on detection that an address of the first committed store memory operation matches an address of the second committed store memory operation at a predetermined granularity, and wherein the write combining buffer is configured to retain up to N entries of the plurality of entries for potential merging, wherein N is an integer greater than one and less than a total number of the plurality of entries, and wherein the write combining buffer is configured to initiate flushing based on a number of occupied entries of the write combining buffer reaching N, and wherein the write combining buffer is configured to write data from one or more of the N entries to a cache based on detection that at least a threshold level of non-merging committed store memory operations have been detected by the write combining buffer even in the event that less than N entries are occupied.

2. The processor as recited in claim 1 wherein the write combining buffer comprises a counter, and wherein the write combining buffer is configured to increment the counter based on detection of a given non-merging committed store memory operation, and wherein the threshold level of the non-merging committed store memory operations is determined from the counter.

3. The processor as recited in claim 2 wherein the write combining buffer is configured to decrement the counter based on detection of a merging committed store memory operation.

4. The processor as recited in claim 2 wherein the write combining buffer is configured to clear the counter based on detection of a merging committed store memory operation.

5. The processor as recited in claim 1 wherein the write combining buffer is configured to write data from one or more of the N entries during a fixed time period subsequent to detection of at least the threshold level of non-merging committed store memory operations, and wherein the write combining buffer is configured to cease writing data from one or more of the N entries based on termination of the fixed time period.

6. The processor as recited in claim 1 wherein N is determined from a watermark maintained by the write combining buffer, and wherein the write combining buffer is configured to reduce the watermark to cause the data from the one or more of the N entries to be written to the cache.

7. The processor as recited in claim 1 wherein the write combining buffer is configured to detect a potential resource conflict to access the cache, and wherein the write combining buffer is configured to write data from the one or more of the N entries prior to an occurrence of an actual resource conflict based on detection of the potential resource conflict, even if the threshold level is not met.

8. The processor as recited in claim 1 wherein the predetermined granularity is based on a data width of a cache port.

9. The processor as recited in claim 1 wherein the write combining buffer is configured to allocate an unoccupied entry of the plurality of entries to a third committed store memory operation that is not mergeable with previous committed store memory operations in the plurality of entries.

10. A write combining buffer comprising:
    a memory comprising a plurality of entries, each entry assignable to a different committed store memory operation; and
    a control circuit coupled to the memory, wherein the control circuit is configured to retain up to N entries in the memory prior to causing one or more entries to drain, wherein N is an integer greater than one and less than a total number of the plurality of entries, and wherein the control circuit is configured to initiate draining of one or more entries based on a number of occupied entries reaches N, and wherein the control circuit is configured to merge a first committed store memory operation into a first entry of the plurality of entries, the first entry storing a second committed store memory operation, and wherein the control circuit is configured to drain one or more entries based on detection that unmergeable committed store operations have reached a threshold even in the event that fewer than N entries are occupied.

11. The write combining buffer as recited in claim 10 wherein the control circuit is configured to increment a counter based on detection of a given unmergeable committed store operation, wherein a value of the counter is compared to the threshold.

12. The write combining buffer as recited in claim 11 wherein the control circuit is configured to decrement the counter based on detection of the merge of the first committed store memory operation.

13. The write combining buffer as recited in claim 11 wherein the control circuit is configured to clear the counter based on detection of the merge of the first committed store memory operation.

14. The write combining buffer as recited in claim 10 wherein the control circuit is configured to terminate draining of the entries after a fixed delay from initiating the draining of the entries.

15. The write combining buffer as recited in claim 10 wherein N is determined from a watermark maintained by the write combining buffer, and wherein the control circuit is configured to reduce the watermark to cause the drain of one or more entries.

16. The write combining buffer as recited in claim 10 wherein the control circuit is configured to detect a potential resource conflict to access a cache, and wherein the write combining buffer is configured to write data from one or more entries prior to an occurrence of an actual resource conflict based on detection of the potential resource conflict, even in the event that fewer than N entries are occupied.

17. A method comprising:
receiving a first committed store memory operation in a write combining buffer;
detecting that the first committed store memory operation is not mergeable with a plurality of committed store memory operations in the write combining buffer;
detecting that a threshold of non-mergeable committed store memory operations has been met; and
writing one or more of the plurality of committed store memory operations to a cache based on determining that the threshold has been met, even in the event that fewer than N entries in the write combining buffer are occupied, wherein N is an integer greater than zero and less that a total number of entries in the write combining buffer, wherein the write combining buffer is configured to write one or more of the plurality of committed store memory operations when a number of occupied entries is at least N.

18. The method as recited in claim 17 further comprising allocating a location in the write combining buffer for the first committed store memory operation.

19. The method as recited in claim 17 further comprising:
receiving a second committed store memory operation in a write combining buffer;
detecting that the second committed store memory operation is mergeable with a third committed store memory operation in the write combining buffer; and
merging the second committed store memory operation and the third committed store memory operation.

20. The method as recited in claim 17 further comprising:
incrementing a counter based on detecting that the first committed store memory operation is unmergeable, wherein the threshold is determined from the counter.

* * * * *